United States Patent [19] [11] Patent Number: 5,564,805
Dickinson [45] Date of Patent: Oct. 15, 1996

[54] STORAGE CONTAINER WITH WHEELS

[75] Inventor: Thomas Dickinson, St. Louis, Mo.

[73] Assignee: Contico International, Inc., St. Louis, Mo.

[21] Appl. No.: 176,860

[22] Filed: Jan. 3, 1994

[51] Int. Cl.⁶ ............................................. B65D 21/00
[52] U.S. Cl. ..................... 312/249.8; 206/508; 206/510; 206/505; 206/518; 206/519; 206/516; 312/351; 312/902
[58] Field of Search ........................... 312/249.8, 351.11; 206/517, 518, 519, 505, 508, 509, 510, 324; 220/408, 410, 505, 508, 518, 519; 62/457.1–457.7; 292/DIG. 37, DIG. 11, DIG. 31, DIG. 30, 202, 204

[56] References Cited

U.S. PATENT DOCUMENTS

| D. 237,135 | 10/1975 | Wiant et al. . |
| D. 237,611 | 11/1975 | Minneman . |
| D. 238,148 | 12/1975 | Dilot . |
| D. 239,695 | 4/1976 | Fier, Jr. . |
| D. 246,872 | 1/1978 | White . |
| D. 248,280 | 6/1978 | Martin . |
| D. 257,934 | 1/1981 | Buss . |
| D. 258,721 | 3/1981 | Steeg . |
| D. 277,797 | 2/1985 | Chabot . |
| D. 286,937 | 11/1986 | Schäfer . |
| D. 292,711 | 11/1987 | Shapiro et al. . |
| D. 302,774 | 8/1989 | Murphy . |
| D. 312,573 | 12/1990 | Poirier . |
| D. 316,516 | 4/1991 | Poirier . |
| D. 319,016 | 8/1991 | Kahl . |
| D. 321,090 | 10/1991 | Dickinson . |
| D. 321,091 | 10/1991 | Dickinson . |
| D. 322,164 | 12/1991 | Hanna et al. . |
| D. 325,323 | 4/1992 | Kahl . |
| D. 325,324 | 4/1992 | Kahl . |
| D. 326,775 | 6/1992 | Skillius . |
| D. 326,815 | 6/1992 | Meisner et al. . |
| D. 327,646 | 7/1992 | Hardigg et al. . |
| D. 328,425 | 8/1992 | Brightbill . |
| D. 328,818 | 8/1992 | Hanna et al. . |
| D. 328,819 | 8/1992 | Hanna et al. . |
| D. 329,331 | 9/1992 | Hobson . |
| D. 329,747 | 9/1992 | Embree . |
| D. 330,161 | 10/1992 | Schuh . |
| D. 330,162 | 10/1992 | Verchere . |
| D. 330,329 | 10/1992 | Brightbill . |
| D. 331,317 | 12/1992 | Tsai . |
| D. 335,960 | 6/1993 | Kahl et al. . |
| D. 336,366 | 6/1993 | Slayton . |
| D. 339,471 | 9/1993 | Maple et al. . |
| D. 342,364 | 12/1993 | Hobson . |
| 1,267,650 | 5/1918 | Flocke ..................................... 292/204 |
| 1,999,162 | 4/1935 | Wolters et al. . |
| 3,163,268 | 12/1964 | Leavell . |
| 3,379,482 | 4/1968 | Baggott . |
| 3,419,184 | 12/1968 | Asenbauer . |
| 3,425,471 | 2/1969 | Yates, Jr. .............................. 206/519 X |
| 3,498,689 | 3/1970 | Hansen . |
| 3,642,168 | 2/1972 | Wiley, Jr. et al. . |
| 3,700,137 | 10/1972 | Souza . |
| 3,979,016 | 9/1976 | Frater . |
| 3,987,829 | 10/1976 | Leone . |
| 4,161,261 | 7/1979 | Frater . |
| 4,293,073 | 10/1981 | Yates, Jr. ................................. 206/519 |
| 4,303,158 | 12/1981 | Perkins ................................. 312/902 X |
| 4,523,692 | 6/1985 | Lemkin . |

(List continued on next page.)

OTHER PUBLICATIONS

Copy of sheet showing the INLOCK container by Tenma Platech & House Wares undated.

Primary Examiner—Peter M. Cuomo
Assistant Examiner—Robert J. Sandy
Attorney, Agent, or Firm—Howell & Haferkamp, L.C.

[57] ABSTRACT

A plastic storage container with wheel assemblies having an axle pin rotatably fixed to the container, a secure lid latch having a double-wall construction to ease opening and closing as well as an offset hinge to allow protection of the latch during distribution, and an internal tray having dependent flanges which mate to the storage container to prevent the walls of the storage container from splaying.

13 Claims, 5 Drawing Sheets

U.S. PATENT DOCUMENTS

| | | |
|---|---|---|
| 4,664,347 | 5/1987 | Brown et al. .................. 206/519 X |
| 4,799,503 | 1/1989 | Tahara .................. 292/DIG. 37 X |
| 4,804,092 | 2/1989 | Jones .................................. 206/519 |
| 4,819,795 | 4/1989 | Swaney . |
| 4,915,913 | 4/1990 | Williams et al. . |
| 4,982,863 | 1/1991 | Skillius . |
| 4,984,687 | 1/1991 | Hanna et al. . |
| 5,011,013 | 4/1991 | Meisner et al. . |
| 5,024,471 | 6/1991 | Kahl et al. . |
| 5,040,834 | 8/1991 | Kahl et al. . |
| 5,042,674 | 8/1991 | Ramsay et al. . |
| 5,065,885 | 11/1991 | Scaroni . |
| 5,065,887 | 11/1991 | Schuh et al. . |
| 5,080,250 | 1/1992 | Dickinson et al. . |
| 5,103,994 | 4/1992 | Doxey et al. .............. 292/DIG. 30 X |
| 5,117,979 | 6/1992 | Brightbill ........................ 312/902 X |
| 5,123,564 | 6/1992 | Hobson . |
| 5,176,281 | 1/1993 | Fiore .............................. 312/902 X |
| 5,186,330 | 2/1993 | McClure ............................ 206/508 |
| 5,190,152 | 3/1993 | Smith et al. . |
| 5,193,706 | 3/1993 | Hanna et al. . |
| 5,244,265 | 9/1993 | Chiang ............................ 312/902 X |
| 5,319,937 | 6/1994 | Fritsch et al. ...................... 62/457.7 |

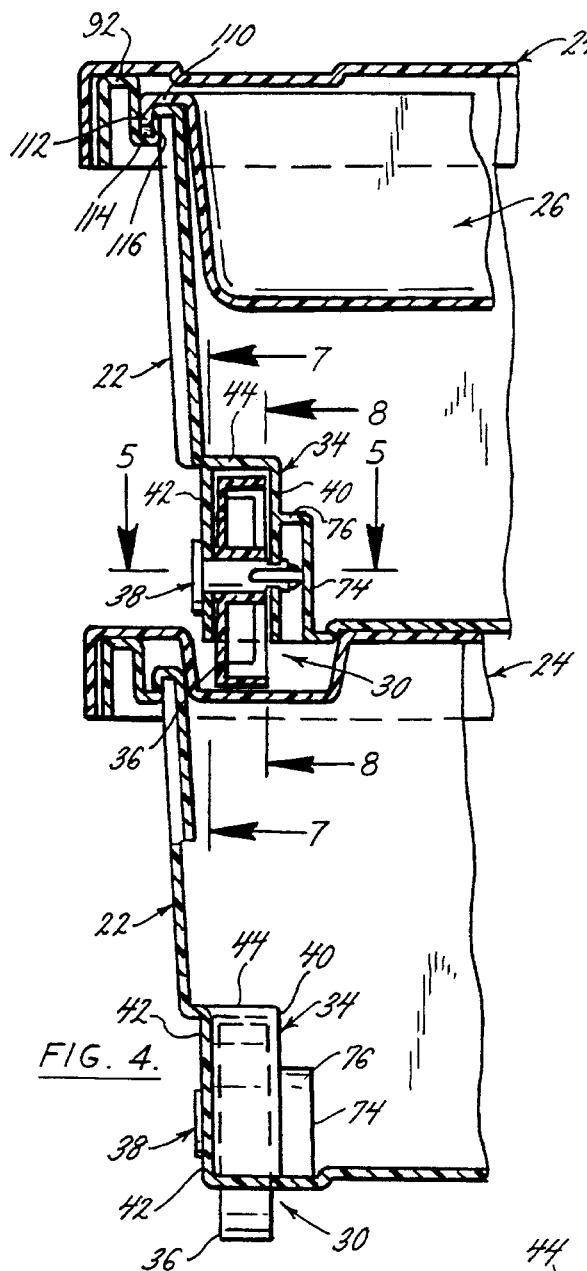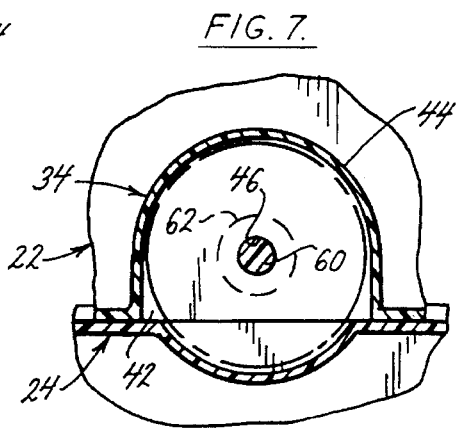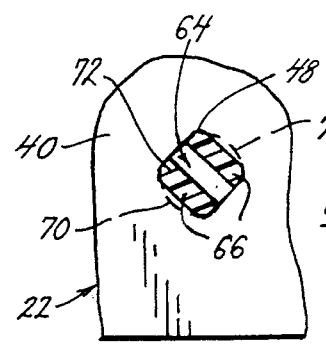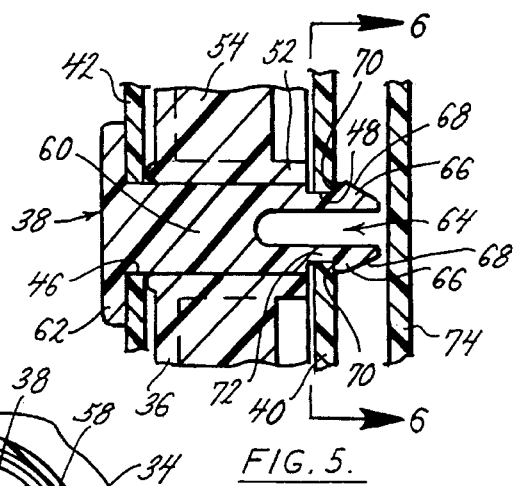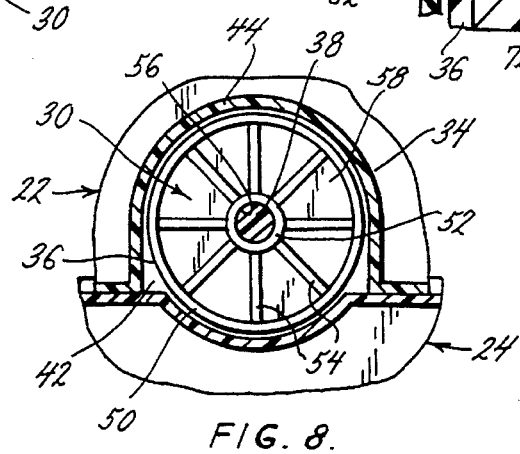

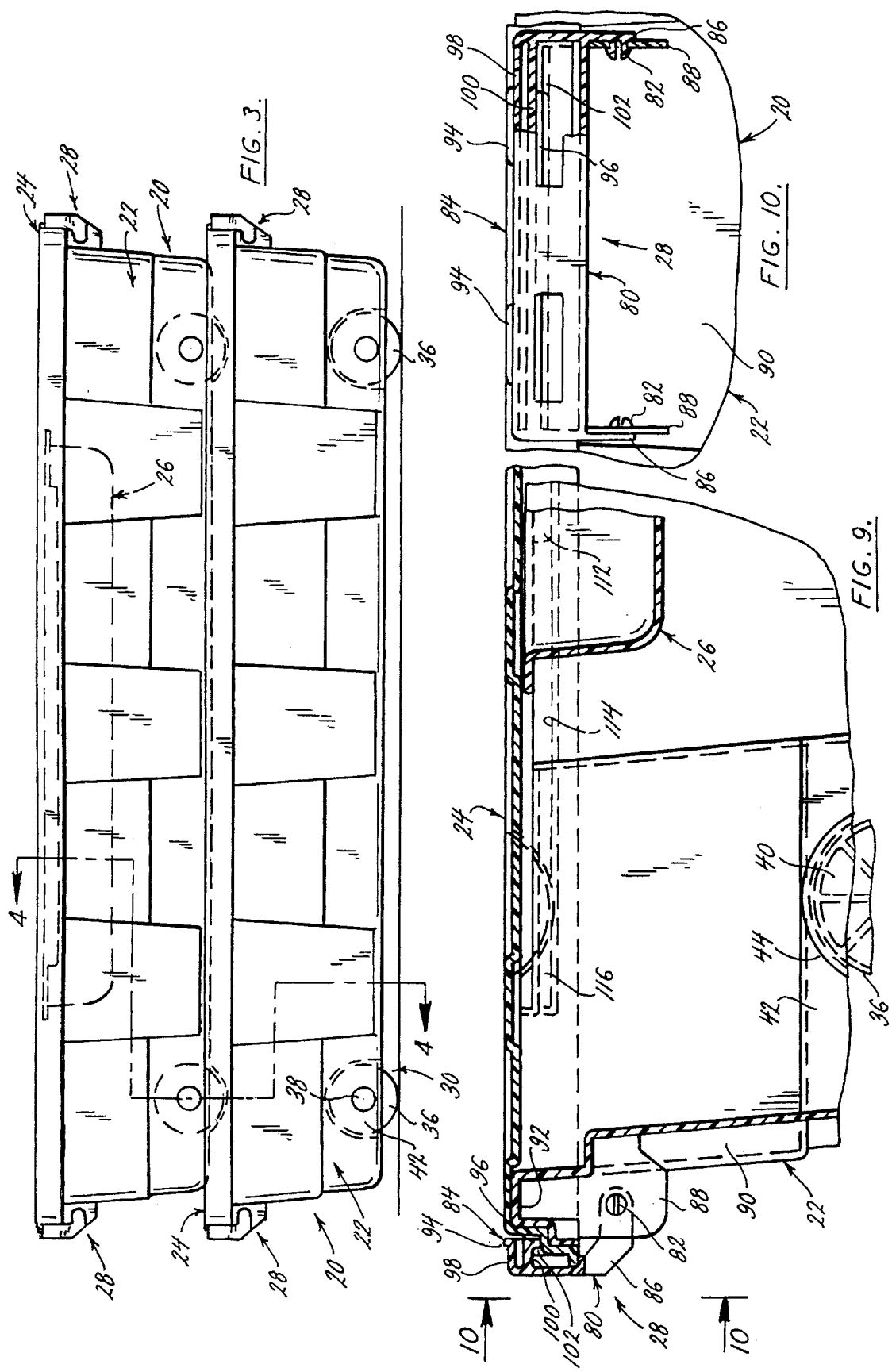

STORAGE CONTAINER WITH WHEELS

BACKGROUND OF THE INVENTION

This invention is directed to the field of storage containers. In particular, the invention is directed to a storage container with integral wheel assemblies, secure lid latches, and an internal tray.

Containers for storage of miscellaneous articles are in the prior art and with the reduction in cost of materials and increase in desire to organize belongings, storage containers are ever-increasing in popularity. The storage container of the present invention has several features which make the container particularly desirable.

Once containers are filled with articles, they may become heavy which makes personal transport more difficult. In addition, containers may be stored in locations which prevent convenient lifting. For example, containers stored underneath a bed are not easily removed by lifting. In the past, the containers had to be dragged, thereby scuffing the container and/or the floor. When the containers were weighted down by being filled with articles, friction between the container and floor made dragging the container difficult.

One aspect of the present invention is wheel assemblies for use in combination with storage containers. In addition to overcoming the problems of the prior art mentioned above, the wheel assemblies are durable, lightweight, and inexpensive to manufacture. In the preferred embodiment of the wheel assembly, the wheel well is integral with the storage box and may be made of the durable and inexpensive materials common in the storage container industry.

Many different lids and latches are present in the prior art. The desirable characteristics of these latches are that they securely fasten the lid to the container and that they are relatively inexpensive. The latch of this invention has these desirable characteristics and is built into the handle of the container. As will be explained below, the latch contains a double-wall feature which makes the latch easier to operate and more secure. Additionally, the latch is designed to fold out of the way when the containers are nested during initial distribution. This feature prevents handling damage to the latches during distribution.

Many prior art storage containers have incorporated separate internal trays for convenient storage of smaller items and for further organization of the contents. These trays typically are suspended from flanges by the walls of the container. In the past when trays were suspended, the walls of the container had to be stiffened to prevent the walls from splaying during use. The suspension means of the subject storage container has features to prevent the walls from splaying. These features reduce the stiffness required in the wall to support the tray and thus reduces the required material. The reduction in material has the advantages of reduced cost and is more environmentally friendly.

The present invention overcomes the disadvantages inherent the prior art storage containers and storage container wheel assemblies by providing a unique wheel assembly, a damage-resistant latch and a splay-resistant tray.

SUMMARY OF THE INVENTION

The present invention is generally comprised of a storage container with integral wheel wells, secure lid latches, and an internal tray.

The wheel assemblies of the present invention are generally comprised of wheel wells, rollers, and axle pins. Round holes extend through the axes of the rollers so that the rollers may be rotatably mounted on the axle pins. In the preferred embodiment, the wheel wells are comprised of two panels integrally formed into the bottom of the storage container. The panels have holes through them which are shaped like the axle pin cross-sections; the hole in the one panel is round so that it provides radial support for the axle pin, and the hole in the other panel is substantially rectangular as is the mating end of the axle pin so as to provide radial support and prevent rotation of the pin. Thus, the axle pin does not rotate relative to the container, but the roller rotates relative to the axle pin. This design reduces wear between the container and pin. In the preferred embodiment, the rectangular hole is obliquely oriented to positively center the axle pin within the wheel well and reduce rattling of the components The square end of the axle pin is forked to permit compression of the pin and has hooks which keep the pin in place in the wheel wells. Compression of the fork permits assembly of the wheel assemblies. In the preferred embodiment, a cover is molded into the container to enclose the hooks while assembled to prevent inadvertent disassembly and for aesthetics.

The latches of the present invention are generally comprised of a handle latch hinged to the container and a mating ridge on the lid. The latch incorporates a double-wall locking mechanism which holds the latch securely in place, yet permits easy opening and closing of the latch. The double-wall construction consists of cantilevered outer and inner plates as shown in FIGS. 9 and 10. The inner plate has the locking mechanism in the form of a detent. A user grips the outer, cover plate to open the latch. Thus, the inner plate comprising the detent is flexible relative to the cover plate. The user does not have to be cognizant of the motion required of the detent in order to operate the latch because the detent is free to displace as needed during opening and closing.

The current invention incorporates a tray having a flange about the periphery and dependent flanges extending vertically down from the flange on at least two opposing sides of the tray. These dependent flanges mate with tracks and rails built into the sides of the storage container so as to allow the tray to freely slide and be removed from the storage container, yet the sides of the storage container are not free to move relative to the tray. Without the dependent flange and rail feature, the sides of the container may flex relative to the tray, thereby allowing the sides to splay and the tray to drop into the container. However, with the feature, splaying is prevented.

While the principal advantages and features of the present invention have been briefly described above, a greater understanding of the novel and unique features of the invention may be obtained by referring to the drawings and the description of the preferred embodiment which follow.

BRIEF DESCRIPTION OF THE DRAWINGS

FIG. 3 is a front elevation view of two stacked storage containers;

FIG. 4 is a section view of the stacked storage containers showing details of the wheel assembly taken at the plane of the line 4—4 of FIG. 3;

FIG. 5 is a section view of the axle pin taken at the plane of the line 5—5 shown in FIG. 4;

FIG. 6 is a section view of the axle pin taken at the plane of the line 6—6 of FIG. 5;

FIG. 7 is a section view of the wheel assembly taken at the plane of the line 7—7 of FIG. 4;

FIG. 8 is a section view of the wheel assembly taken at the plane of the line 8—8 of FIG. 4;

FIG. 9 is a section view of the storage container showing details of the latch;

FIG. 10 is a detail view partially in section of the latch taken at the plane of line 10—10 of FIG. 9;

DETAILED DESCRIPTION OF THE PREFERRED EMBODIMENTS

Figure 1:
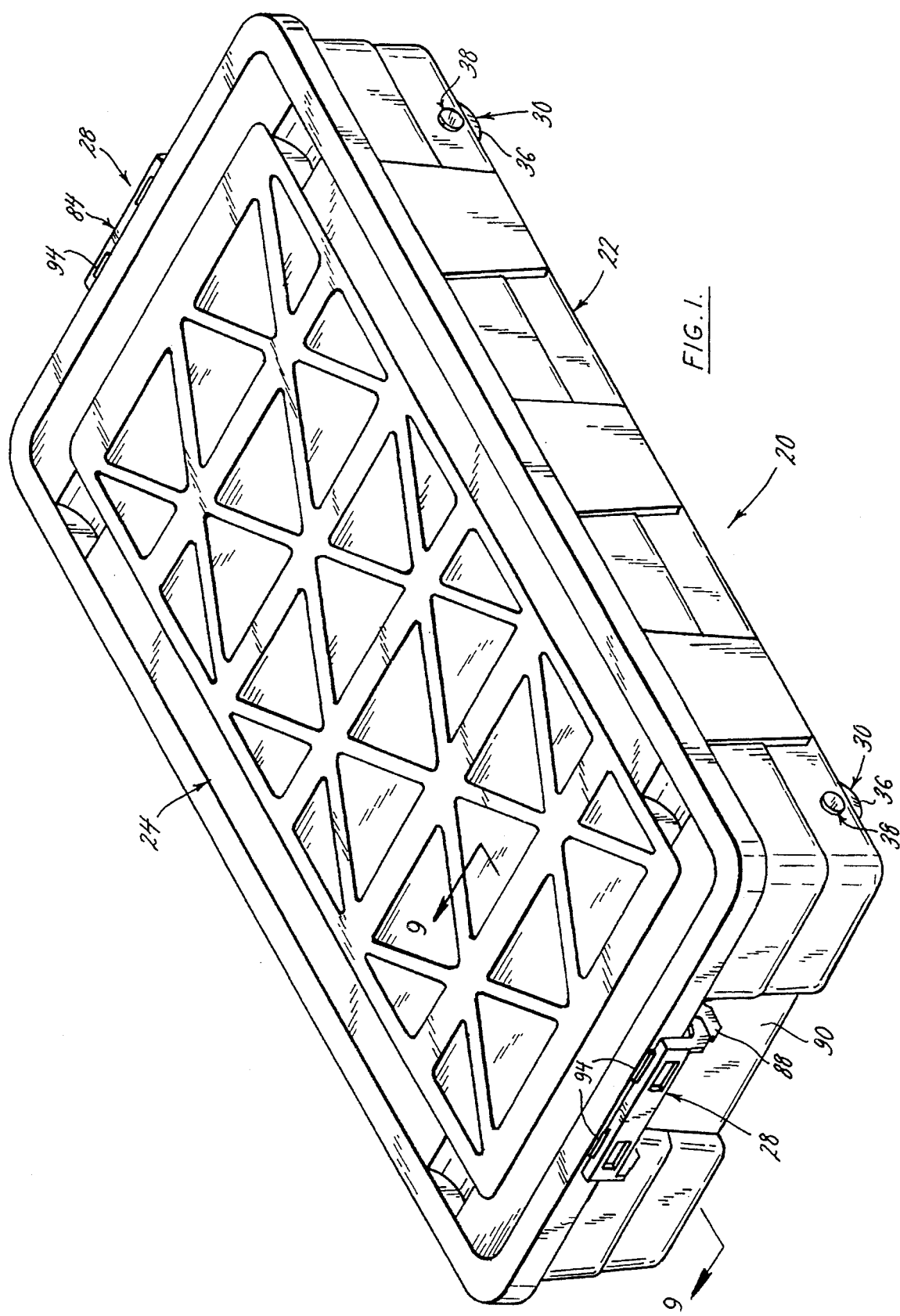
FIG. 1 is an orthographic view of a storage container of the present invention.
Figure 2:
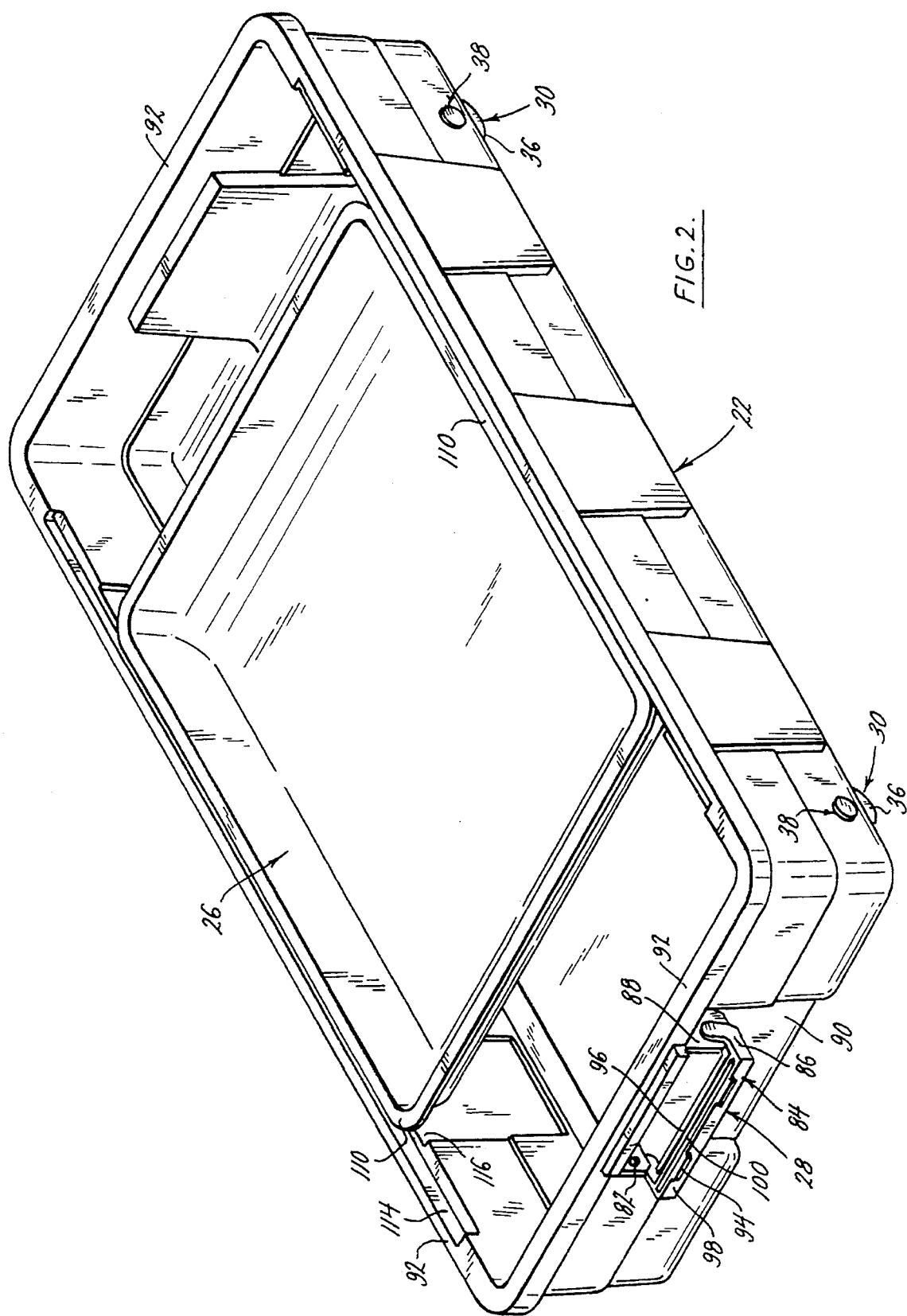
FIG. 2 is an orthographic view of a storage container showing details of the interior of the container.

The storage container 20 is generally comprised of an open-top box 22, a lid 24, a tray 26, latches 28, and wheel assemblies 30.

As best seen in FIG. 4, each wheel assembly 30 is generally comprised of a wheel well 34, a roller 36, and an axle pin 38. The wheel well 34 is formed by a first panel 40 spaced from a second panel 42 by an arcuate band 44. The first panel 40 has a square hole with rounded corners 48 located at the axis of the arc of the arcuate band 44. A circular hole 46 is located in the second panel 42 at the axis of the arc of the arcuate band 44. The function of the holes 46, 48 will be described hereinafter.

The roller 36 is comprised of a cylindrical rim 50 and cylindrical hub 52 spaced by a plurality of planar spokes 54 as depicted in FIG. 8. A circular aperture 56 extends through the hub 52, and a planar web 58 connects one end of the hub 52 to the adjacent end of the rim 50 so as to provide further stiffening to the spokes 54. The diameter of the roller 36 is smaller than the diameter of the arcuate band 44 of the wheel well 34 such that the roller 36 can freely rotate within the wheel well 34. Similarly, the length of the cylinder is less than the distance between the first and second panels 40, 42 of the wheel well 34 to permit free rotation of the rollers.

As shown in FIG. 5, the axle pin is comprised of a cylindrical axle section 60. A cap 62 is molded onto one end of the pin. At the other end of the axle section is a fork 64 with two opposite outward facing hooks 66 on the tines. The hooks 66 restrain the axle pin 38 from moving axially. The fork 64 may be compressed to permit assembly of the wheel assembly 32.

The hooks 66 are comprised of a lead-in chamfer 68, a retention lug 70 and a neck section 72. The dimensions of the chamfers 68 and lug 70 are such that when the fork 64 is compressed, the hooks 66 may be easily pushed through the square hole 48 in the first panel 40 of the wheel well 34. The neck section 72 has a square cross-section with rounded corners to prevent the axle pin 38 from spinning within the square hole 48 after assembly. Although in the first preferred embodiment the hole 48 and neck section 72 are both square, numerous polygonal shapes may be employed in alternate embodiments to prevent relative rotation between the pin and wheel well. The dimensions of the circular aperture 56 of the roller 36 and the axle section 60 of the axle pin 38 permit relative rotation between the component parts. The dimensions of the hooks 66 and square hole 48 permit small forces for ease of assembly, yet retain the axle pin 38 after assembly.

In the wheel assembly's preferred embodiment, a third panel 74 is spaced from the second panel 42 by a second arcuate band 76. This second arcuate band 76 and third panel 74 form an enclosure for the hooks 66 of the axle pin 38. Thus, inadvertent disassembly is prevented, and the internal aesthetics of the container 20 are enhanced.

Figure 11:
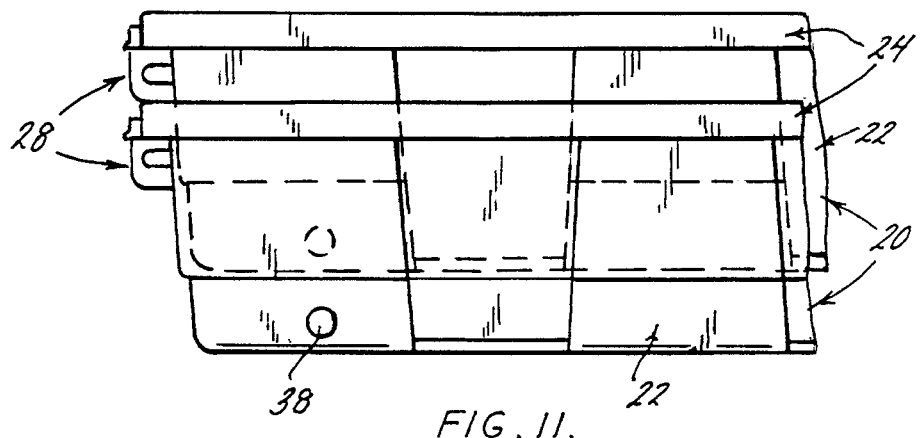
FIG. 11 is a front elevation view of two nested storage containers.
Figure 12:
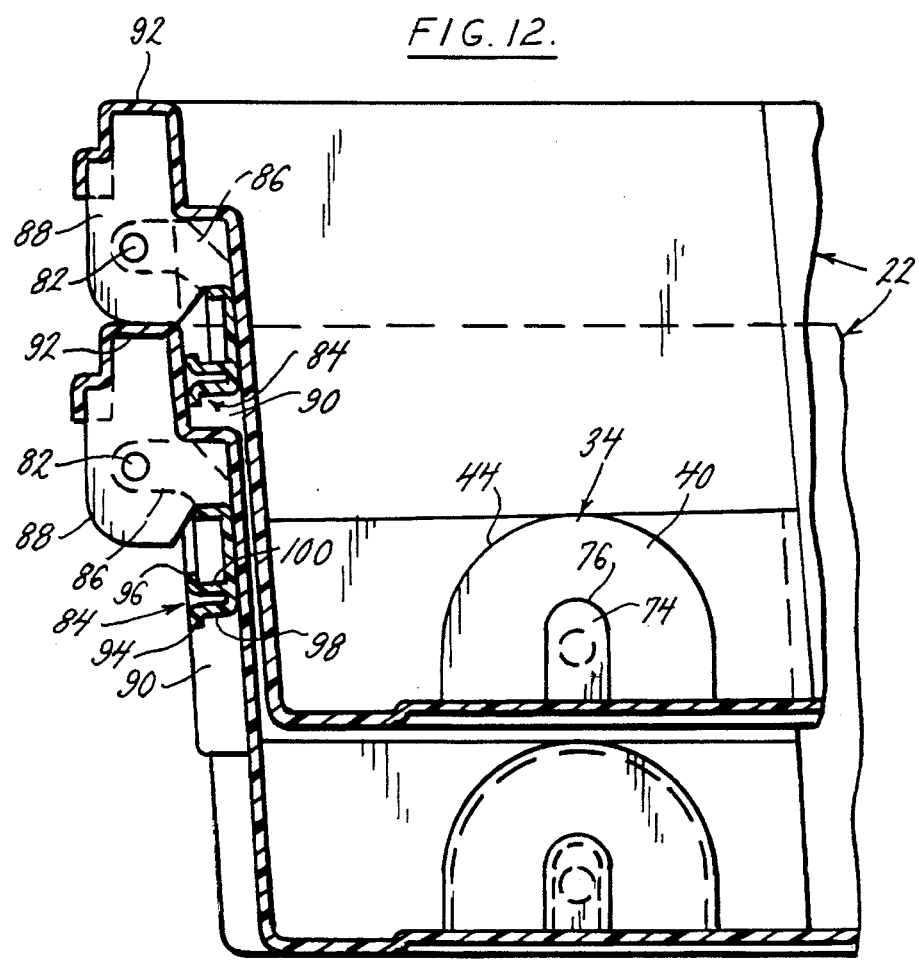
FIG. 12 is a section view of two nested storage containers showing the handles recessed into the containers.

As best seen in FIGS. 9 and 10, each latch 28 is comprised of a handle body 80, an offset hinge means 82, and a double-wall locking mechanism 84. The hinge means pivotally attaches the latch 28 to the box 22 and is offset from the handle as shown in FIG. 9 by arms 86 on the latch and ears 88 on the box so that when fully opened the handle body recesses into a concave portion or end recess 90 of the storage container as shown in FIG. 12. The handles may pivot downward within the recess 90 so that when nested as shown in FIGS. 11 and 12, the top box nests inside the bottom box with the bottom box extending upward, past the downward pivoted handles. In this way, the handles of the upper box are tucked inside the end walls of the lower box to protect the handles during shipment and storage. Thus, when the containers are nested, the handle bodies are not protruding outside the envelope of the storage containers, thereby reducing the possibility for handling damage in transport. The ears 88 extend downward so that when nested the ears of the upper box contact the top of the rim 92 of the lower box to prevent the nested boxes from becoming wedged together which would make separation difficult.

The double-wall locking mechanism is comprised of a gripping tab 94 and a detent 96 extending from two cantilever plates 98, 100 of the handle body 80. The gripping tab 94 extends vertically upward from the outer or cover plate 98 when in the closed position to aid in the opening of the latch mechanism. The detent 96 extends downward from the inner plate 100 in the closed position and engages with a mating ridge 102 molded into the lid 24. Thus, when snapped closed, the detent 96 and ridge 102 interfere to prevent inadvertent opening of the latch mechanism 28. In addition, a spacer 104 having a lip 106 extends below the ridge 102 of the lid 24. The latch 28 has a flange 108 which engages the lip 106 of the spacer 104 when the detent 96 is snapped closed over ridge 102 to bias the detent downward to further inhibit inadvertent opening of the latch mechanism. Thus, when the latch mechanism is closed, the spacer 104 is positioned between the detent 96 and the flange 108.

As shown in FIG. 4, the tray assembly 26 is generally comprised of a peripheral flange 110 and a pair of dependent flanges or ribs 112 extending downward from the peripheral flange on opposite sides of the tray. In the assembled condition, these dependent flanges 112 sit within tracks 114, outside of mating rails or ledges 116 molded into the walls of the storage container. These mating dependent flanges, tracks and rails prevent the walls of the container from displacing outward which would permit the tray to drop into the container. In the preferred embodiment, the rails are vertically recessed into the container away from rim 92 to permit full closure of the lid upon the storage container 10. In addition, the tracks 114 and rails 116 are longer than the tray 26, thereby permitting the tray to be slid along the rails for access to the bottom of the storage container without removing the tray.

While the present invention is described by reference to specific embodiments, it should be understood that modifications and variations of the invention may be constructed without departing from the scope of the invention defined in the following claims.

What is claimed is:

1. A plastic storage container assembly comprising:

an open-top box;

a lid for covering the top of the box, said lid having a locking ridge; and a latch having a detent configured for engaging the locking ridge to releasably secure said lid to said box, said latch being hinged to said box and opening into a recess within a wall of said box to reduce handling damage to said latch during transport, the latch detent being entirely recessed within the recess when the latch is fully opened and remote from the recess when the latch is engaged with the locking ridge.

2. A plastic storage container assembly comprising:

an open-top box having a bottom and a side extending upward from the bottom, the side having an upper edge;

a lid for covering the top of the box; and a latch for releasably securing said lid to said box, said latch being hinged to said box and being pivotable into a recess within the side of said box to permit the storage container to be nested within a like storage container having a bottom below the subject storage container such that the latch extends below the upper edge of the side of the lower, like storage container to capture and protect said latch.

3. A plastic storage container assembly comprising:

a box comprising a bottom, an open top opposite the bottom and two opposing sides, said box having a length and a width; and a tray within the box, said tray having first and second lateral dimensions extending parallel to the top of the box, the first lateral dimension being substantially equivalent to the width of said box, said tray being suspended above the bottom of said box, and being slidable within and engageable with the sides of said box to prevent the sides of the box from substantially displacing relative to one another.

4. The container assembly of claim 3 further comprising:

a flange extending laterally from the periphery of said tray; and a ledge integral with the sides of said box upon which the tray flange rests.

5. A plastic storage container assembly comprising:

a box comprising a bottom and two opposing sides, said box having a length and a width;

a tray within the box, said tray having first and second lateral dimensions, the first lateral dimension being substantially equivalent to the width of said box, said tray being suspended above the bottom of said box, and being slidable within and engageable with the sides of said box to prevent the sides of the box from substantially displacing relative to one another;

a flange extending laterally from the periphery of said tray;

a ledge integral with the sides of said box upon which the tray flange rests;

a rib extending vertically downward from the flange; and a rail extending vertically upward from the sides of said box, the rib and rail being interengaged to prevent the sides of said box from moving relative to each other.

6. A plastic storage container assembly comprising:

a box comprising a bottom and two opposing sides, said box having a length and a width;

a tray within the box, said tray having first and second lateral dimensions, the first lateral dimension being substantially equivalent to the width of said box, said tray being suspended above the bottom of said box, and being slidable within and engageable with the sides of said box to prevent the sides of the box from substantially displacing relative to one another;

a rib extending vertically downward from said tray; and a rail extending vertically upward from the sides of said box, the rib and rail being interengaged to prevent the sides from moving relative to each other.

7. A plastic storage container assembly comprising:

a box comprising a bottom and two opposing sides, said box having a length and a width;

a tray within the box, said tray having first and second lateral dimensions, the first lateral dimension being substantially equivalent to the width of said box, said tray being suspended above the bottom of said box, and being slidable within and engageable with the sides of said box to prevent the sides of the box from substantially displacing relative to one another;

a rib extending vertically downward from said tray; and a track formed within the opposing sides of the box, the rib and track being interengaged to prevent the sides from moving relative to each other.

8. The container assembly of claim 3 wherein:

the second lateral dimension of said tray is less than the length of said box so that said tray may be slid in the second lateral dimension direction while seated within said box so as to expose a portion of the contents of said box.

9. The container assembly of claim 3 further comprising a wheel assembly for transporting said container assembly.

10. The container assembly of claim 3 further comprising a lid to cover the contents of said box.

11. The container assembly of claim 10 further comprising a latch for securing the lid to said box.

12. A plastic storage container assembly comprising:

an open-top box;

a lid for covering the top of the box, said lid having a locking ridge, the lid including a spacer extending below the locking ridge; and a latch for releasably securing said lid to said box, said latch being hinged to said box, said latch having a first plate with a detent depending therefrom for releasable engagement with the locking ridge, and a second plate over the detent for gripping said latch while opening, the first and second plates being coextensive, said first plate being flexible relative to said second plate to allow relative motion between the second plate and detent upon opening and closing said latch, the latch including a flange spaced from the detent, the flange being positioned to engage the lid spacer upon closing the latch to bias the latch detent toward the lid locking ridge.

13. A nestable plastic storage container assembly comprising:

a box having a bottom, an open top surrounded by a rim, and a set of aide walls defining a storage area within the box, each one of the side walls thereby having an interior and an exterior face relative to the box;

a lid for covering the open top of the box;

a pair of ears extending outwardly from an upper region of the exterior face of one of the side walls, the same